April 23, 1963  H. P. ZARTLER  3,086,270
HOSE CLAMP AND METHOD OF ASSEMBLY
Filed May 11, 1960
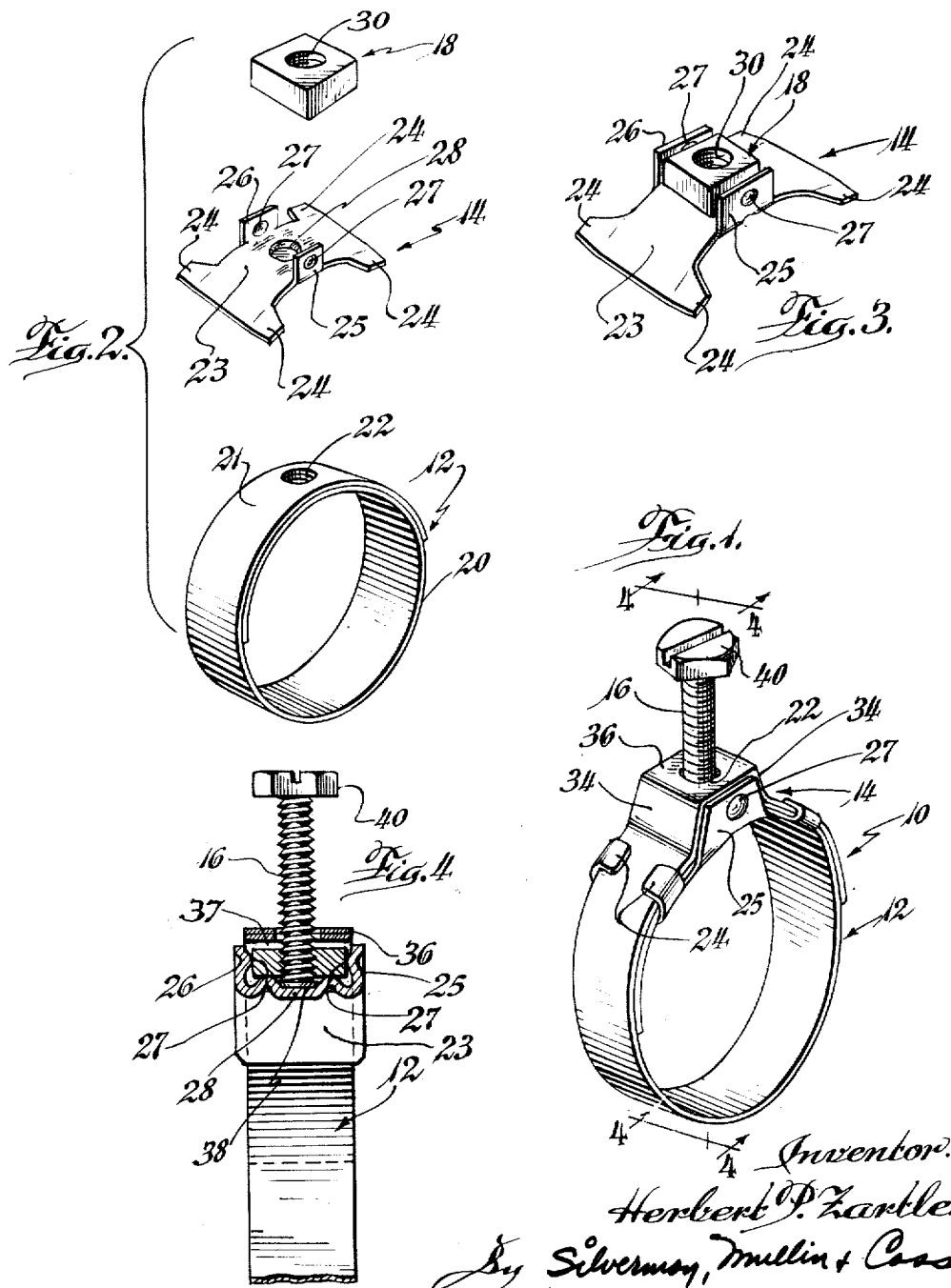
Inventor:
Herbert P. Zartler
By Silverman, Mullin & Cass
Attorneys.

United States Patent Office 3,086,270
Patented Apr. 23, 1963

3,086,270
HOSE CLAMP AND METHOD OF ASSEMBLY
Herbert P. Zartler, Hillside, Ill., assignor to Wittek Manufacturing Co., Chicago, Ill., a corporation of Illinois
Filed May 11, 1960, Ser. No. 33,354
3 Claims. (Cl. 24—278)

This invention relates generally to hose clamps and more particularly, relates to improvements in structural features for hose clamps of the radial screw type and a novel method of making such clamps.

This is a continuation-in-part of application for patent, Serial No. 827,806 filed July 17, 1959, now abandoned, for "Hose Clamp and Method of Assembly."

Hose clamps of the general type with which this invention is concerned have been used advantageously for coupling flexible conduit such as hose, to pipe. In many types of systems in which the juncture of the hose and pipe is subjected to severe conditions of temperature and pressure change it is required that the hose clamp be very durable and capable of maintaining the desirable hose connection reliably and continuously. Generally, the clamps involved in the herein invention include a flexible tension band having a retainer structure connecting the ends of the band and some manner of tightening means supported by the retainer structure for exerting tension on the band to tighten same on the conduit or hose. Such tightening means may comprise an elongate bolt suitably journalled with respect to the ends of the band in the retainer structure so that taking up on the tightening bolt will place the band under tension whereas rotation of the tightening bolt in the opposite direction will relieve the tightening action of the band.

In the radial screw type of hose clamp, an example of which is illustrated in U.S. Patent No. 2,278,337 granted March 31, 1942 to Benjamin A. Tetzlaff, a floating bridge assembly is associated with the tension band and the said assembly includes a journal for the tightening bolt in the form of a nut through which the bolt is threaded for moving the bridge assembly to effect tensioning of the band. Other clamps of the radial screw type use bridge structures provided with bent flanges at the ends of the bridge structures which overlap and grip the edges of the band and permit the bridge structure to slide on the band for tightening the same, however, the tightening bolt is journalled in some manner of nut required to be assembled to and mounted in the bridge structure. Movement of the tightening bolt is in a direction along a radius of the tension band and hence, the reference to such hose clamps as being of the radial screw type.

It will be understood from the above discussion that the types of hose clamps referred to employs a nut with which the tightening bolt or screw is threadedly engaged for tightening and loosening of the tension band. These hose clamps have been used successfully for many years and have been more universally available in many different sizes ranging generally from approximately one-half to three inches and more in diameter. Of course, special hose clamps of larger sizes have been available for special usages, but their construction is the same for each type of hose clamp. Manufacturing techniques including automatic equipment to form and assemble the several parts of each type of hose clamp have been developed which make possible uniformity of specifications and consistently high quality products at economically favorable cost, however, in one area of production, these desirable developments have not been achieved heretofore, at least within a satisfactory degree of success. This is in the area of the smaller size of hose clamp, such as for instance, in the range of one-half to one inch diameter clamp and smaller. In this range of hose clamp size, considerable difficulty was encountered in assembling the relatively small component parts thereof, that is, in positioning and holding the various small parts so that the assembly of the hose clamp could be completed. One particularly difficult procedure was encountered in connection with properly aligning and assembling the nut to the bridge member in the case of the radial screw type clamp so that the tightening bolt or screw could be engaged with the nut. In addition, it was necessary to position and hold the nut so that the nut would not move out of position during the various stages of assembly of the hose clamp. Coextensive with these inherently difficult procedures was the problem of installing the nut in the retainer structure of the hose clamp without weakening the retainer structure and still be able to utilize the highly desirable techniques of economical mass production and automatic assembling equipment.

Prior hose clamps which have used tightening screws and nuts have had some means for holding the nuts in position on the clamps so that if the screw should be removed from any clamp it could readily be replaced. In the case of the radial types various means used in the past have been expensive and complex. In addition, they have been difficult if not impossible to manufacture in very small sizes. One example is shown in Tetzlaff Patent 1,584,332, in which a special nut is required to have lateral projections engaging slots formed in the retainer therefor.

According to the invention herein, the nut which is used is a simple and readily obtained stock item, and is held in position in the retainer therefor in the completed clamp in perfect alignment with the screw, notwithstanding its ability to move to the wall against which it bears during operation of the clamp. Thus, if the screw is for any reason removed, it may be directly inserted and it will align properly. This is an advantage which obtains in addition to the usefulness of the abutments holding the nut in place during assembly of the clamp.

Accordingly, it is a principal object of the invention to provide a hose clamp of the character described having important structural improvements and a method of assembling such a hose clamp which will substantially eliminate all of the disadvantages hereinabove enumerated, especially in the case of the smaller and more difficult to handle clamps.

Another important object of the invention is to provide a hose clamp of the character described having a novel retainer structure for a nut intended to be engaged with the tightening bolt or screw of the hose clamp, said retainer structure including a pair of parallel guide walls adapted to receive and hold the nut therebetween properly positioned for engagement with the tightening bolt or screw, each of said walls having abutment means on facing surfaces thereof for frictionally engaging and holding the nut between said walls.

Another principal object of the invention is to provide an improved method of assembling a hose clamp of the character described which enables the nut to be assembled in the retainer structure of the clamp properly aligned to be engaged with the tightening screw by high-speed, mass-production techniques and which is further characterized by its superlative adaptability and suitability for manufacture of such hose clamps in smaller sizes.

Another object of the invention is to provide a method of assembly of a hose clamp of the character described which comprises forming a retainer structure for clamp either of the radial screw by bending a sheet metal member to provide a pair of upstanding, parallel guide walls spaced apart a distance greater than the width of a nut to be accommodated between said walls, said guide walls being disconnected along at least one pair of oppositely aligned edges thereof to provide an entrance to the space therebetween, inserting a nut into said space through said entrance into a predetermined position of alignment to permit engagement thereof with a tightening bolt through a wall of the retainer structure, the walls being formed with inwardly extending abutment means on said parallel walls to frictionally engage and hold the nut in said predetermined position prior to assembly of the nut thereto.

Another object of the invention is to provide a hose clamp of the radial screw type having a bridge member adapted to be initially formed as a blank with integral portions thereof adapted to be folded and bent into the desired bridge member by means of economical, high-speed machinery; and further, to achieve the foregoing object in connection with relatively small sizes of hose clamps.

Still a further object of the invention is to provide a hose clamp of the character described in which there is a nut provided to be engaged with a screw in constricting the hose clamp about a conduit or the like, and in which the nut is of conventional construction, and is frictionally held in position aligned with the axis of the screw by means of projections or protuberances formed on the nut retainer so that in addition to facilitating assembly of the clamp during manufacture, in the event the screw is removed from the clamp, the nut will remain aligned therewith to enable the screw readily to be returned to its proper position.

In addition to the above object it will be appreciated that the invention contemplates that the nut is actually movable while being disposed in the retainer therefor. In the case of the radial screw type of clamp, the nut moves vertically during tightening and loosening of the band. In the radial type of clamp, the nut is caged in its location.

The foregoing and other objects of the invention will become apparent from the ensuing description, in connection with which a detailed disclosure is set forth in the specification and illustrated in the accompanying drawings. Minor variations in the structural features of the hose clamps and the steps of the method of assembly thereof may occur to the skilled artisan without departing from the scope or sacrificing any of the advantages thereof.

In the drawing:

FIG. 1 is a perspective view of a hose clamp of the radial screw type constructed in accordance with the principles of the invention.

FIG. 2 is an exploded perspective view of the several components of said hose clamp prior to their assembly to complete the hose clamp.

FIG. 3 is a perspective view showing an initial stage of the assembly wherein the nut is assembled to the bridge component of the hose clamp embodying the invention.

FIG. 4 is a sectional view taken through said hose clamp along the line 4—4 of FIG. 1 and in the general direction indicated.

Referring now to the drawings, in FIGS. 1 through 4, a hose clamp of the radial screw type with which the invention is concerned is designated generally by the reference character 10. Said hose clamp has a flexible metal tension band or strap 12, a bridge element 14, a tightening screw 16 and a supporting nut 18 adapted to be threadedly engaged on the shank of the tightening screw 16.

The tension band 12 is formed of a strip of spring steel or the like which has been looped to provide a semi-circular medial portion 20, the ends of the band overlapping to provide a double-ply arcuate portion 21. The arcuate portion is perforated to provide a passageway 22 substantially perpendicular to the axis of the band. The illustration of the band 12 in FIG. 2 shows the same prior to assembly thereof with the bridge member to form the clamp. The passageway 22 may be punched or otherwise formed at the time that the strip of metal is shaped to form the closed loop formation illustrated.

The bridge member 14 initially is produced as a relatively rigid metal member stamped or otherwise formed as a blank. Same includes an arcuate segment 23 of generally rectangular configuration having an extension or tab 24 at each corner thereof and a pair of upstanding guide walls or lateral flanges 25 and 26 secured along opposite side edges of the segment 23 substantially midway between said extensions. The walls 25 and 26 each have an inwardly extending abutment or projection 27 on the inside surface thereof extending substantially parallel with the axis of the band, said projections 27 cooperating to provide advantageous means for holding and positioning the nut 18. The tabs 24 preferably extend outwardly in the same plane as the arcuate segment 23, but could be arranged in planes transverse to the segment 23 under certain circumstances. However, when the tabs 24 initially are flattened out as seen in FIG. 2, assembly of the clamp is facilitated. Intermediate the guide walls is formed a depressed bearing seat 28 located to accommodate an end of the tightening screw 16 in the completed clamp.

Referring to FIG. 2, nut 18 is a commercially available component of rectangular configuration and having a threaded passageway 30 therethrough. The dimensions of the nut are selected to permit installation thereof between the upstanding walls 25 and 26 with passageway 30 in registry with the bearing seat 28. The distance between the parallel walls 25 and 26 is slightly greater than the width of the nut 18 so that insertion of the nut 18 between the walls 25 and 26 is readily accomplished. The means 27 provided on facing surfaces of the walls 25 and 26 cooperate to hold the nut in the desired position between said walls.

To assemble the clamp 10 in accordance with the method embodying the invention, the procedure is commenced with the pre-fabricated component parts illustrated in FIG. 2. The first phase of the method preferably is to assemble the nut and bridge member together to the condition thereof seen in FIG. 3. This may be accomplished using automatic equipment, for instance, which has a suitable jig or saddle for supporting the bridge member 14 with the parallel walls 25 and 26 in position to receive the nut and means for pressing the nut into position. This equipment may include means for inserting the nut between the walls 25 and 26 from a location above the member 14 as illustrated in FIG. 2, or the nut may be manually inserted between said guide walls above the projections. The nut 14 is then pressed inwardly toward the bearing seat 28 between the facing abutments or projections 27, the walls 25 and 26 having sufficient limited resilience to spread apart to permit the nut to be seated on the segment 23. It is contemplated also that the flanges 25 and 26 may originally diverge and the assembly of the bridge member and nut be accomplished by placing the nut on the arcuate segment 23 and forcing the walls 25 and 26 toward one another to cause the projections 27 to bear against adjacent surfaces of the nut and retain the nut in the desired position with the passageway 30 substantially normal to the axis of the clamp. This procedure results in the bridge assembly with the nut 18 in desired position for subsequent assembly operations without separating the nut from the bridge member. The nut is resiliently clamped between the guide walls 25 and 26 and is permitted slight movement up and down between the projections 27. Thereafter, the bridge assembly as illustrated in FIG. 3 (with the nut 18 installed) is assembled to the tension band 12 which has been preformed to condition thereof shown in FIG. 2.

The bridge assembly of FIG. 3 can be attached to the tension loop also by means of automatic equipment since the nut 18 already is secured to the bridge member 14. The bridge assembly is inserted on the interior of the loop at the overlapped portion 21 and arranged so that the overlapped portion 21 passes over the nut and the passageway 30 is aligned with the passageway 22 in the overlapped portion. By means of suitable tools, the overlapped portion 21 is shaped to a bight having an inverted, substantially U-shaped configuration defined by a pair of segments 34 connected by a web 36 having the passageway 22 therein. The nut 18 is disposed between said segments 34 below the web 36 and simultaneously, the tabs or extensions 24 are return bent to slidably engage opposite edges of the overlapped portion 21. Thus, in the completed clamp, the overlapped portion 21 has a radially extending bight clearing the nut by the space 37. The nut, of course, is secured between the side walls 25 and 26 of the bridge member between the arcuate segment 23 and the web segment 36.

To complete the hose clamp, the tightening screw is inserted into passageway 22 and threadedly engaged through the passageway 30 in the nut so that the free end 38 of the screw can be engaged against the bearing seat 28. It will be appreciated that it is most important that the passageway 30 and passageway 22 be properly aligned to receive the screw 16 and the invention enables this to be accomplished because the nut 18 is always retained in proper position between the side walls 25 and 26 by means of the projections 27. Installation of the tigthening screw may be facilitated by use of a wrench or screw-driver engaging the head 40 of the screw. The clamp may be sold in the condition where end 38 of the tightening screw is partially engaged in the passageway 30. In use, the tightening screw is rotated to drive the end 38 entirely through the nut 18 into engagement with the bearing seat 28. Continued rotation of the screw cannot result in further axial movement thereof, but instead, the nut 18 will be forced to move toward the connecting web 36 in opposition to the holding force of the projections 27. Movement of the nut 18 continues in the space 37 until the upper face of the nut bears against the bottom surface of the web 36. Further rotation of the screw will cause the bridge 14 to move away from the bight or web 36, the bridge member sliding on the overlapped segments of the tension band to exert a tension on the band which effects constriction thereof.

It will thus be apparent that the bridge assembly illustrated in FIG. 3 whereby the nut 18 is assembled to the bridge member 14 is a very advantageous achievement. No welding or the like is required, the nut 18 being held by the projections 27 in the desired proper condition for receiving the tightening screw through the passageway 22. In this way, the size of the bridge assembly and its component parts may be relatively small, such as would be the case with hose clamps of one-half to one inch diameter in size and smaller. The bridge assembly can be assembled rapidly and efficiently and accurately to the tension band without loss, displacement or separation of the nut 18 from the bridge member 14 since the projections 27 retain the nut in the desired position relative the passageway 22. Further, guide walls 25 and 26 are imperforate; there are no recesses or passageways cut in these walls. Thus, as the tightening screw is advanced to install the hose clamp, there is no weakened portion on the walls 25 and 26 to subject to twisting or distortion because of the strain under which same are placed during the tightening of the hose clamp. Such twisting or distortion could cause the nut 18 to become misaligned relative the passageway 22 so that the tightening screw would bind in the passageway 22.

It will be apparent that the invention contributes to important advantages in connection with the manufacture and assembly of hose clamps of relatively smaller size. The component parts of the smaller sizes of hose clamps are correspondingly smaller and hence, more difficult to handle during assembly of the clamp. The invention enables the small support nut 18 for the tightening screw of the hose clamp to be assembled to the nut retainer structure therefor swiftly and accurately and hence, enables such small sizes of hose clamps to be economically manufactured. In addition, the invention achieves this object without resulting adverse weakening of the guide walls of the nut retainer structure.

It is believed that the invention has been described sufficiently, both as to the improved construction for a hose clamp and the method of making the same so that the skilled artisan can understand and practice the same. It is intended that the language of the claims hereto appended be construed broadly commensurate with the progress in the arts and sciences contributed thereby.

What it is desired to secure by Letters Patent of the United States is:

1. A hose clamp of the radial screw type including a band looped upon itself and having its ends overlapped, an outwardly extending bight formed in said overlapped ends, an arcuate member bridging said bight on the interior of said loop, said arcuate member having opposed flanges at each end thereof slidably engaging said loop, a nut disposed in the circumferential space between said outwardly extending bight and said arcuate member, a radial screw freely passing through said overlapped ends and engaging said nut and bearing against the top of said arcuate member whereby to constrict the loop when the screw is driven into said nut to force the nut against the inside of said bight, holding and positioning means whereby said component parts are aligned during assembly thereof, said means comprising a pair of resilient upstanding guide walls on opposite edges of said arcuate member substantially medially between said flanges, said walls each having an inwardly extending abutment on the inside surface thereof, the abutments being aligned on a line parallel to the axis of the clamp, said nut having a pair of opposite flat surfaces spaced apart, the distance between abutments being less than the dimension across the flat surfaces of the nut prior to assembly of said hose clamp, whereby the nut is forced between said abutments during assembly, spreading said walls and frictionally holding said nut in position to enable engagement with said screw when inserted, but permitting movement of the nut overcoming said friction when the screw is operated.

2. A hose clamp formed of at least three parts each separately manufactured and then assembled together, said parts comprising a circular metal tension band, a nut and a tightening screw, said metal tension band having end portions and there being means on the end portions having the tightening screw journalled therein for rotation for constricting the band on a hose connection or the like, said means including a nut retainer structure having a pair of upstanding parallel walls provided with inwardly directed resiliently yieldable protuberances, said protuberances being aligned on a line parallel to the axis of the circular tension band, said nut being of conventional construction and having a pair of opposite lateral parallel surfaces of predetermined spacing, the distance between protuberances being less than the said spacing prior to assembly of the nut in the retainer structure whereby in order to assemble the nut to the band it is necessary to force the nut between the protuberances thereby spreading the protuberances apart and biasing the protuberances resiliently into frictional engagement with said lateral surfaces, the retainer structure having a perforated wall and the perforation being aligned with the axis of the threaded opening of the nut, said tightening screw extending freely through the perforation and into engagement with the nut, whereby taking up on the screw will force the nut to overcome the frictional engagement of said protuberances and move toward and into engagement with the said perforated wall to cause constriction of said band, said clamp being of the radial screw type and said end portions being overlapped and having a radially outward bight formed therein and a bridging member slidably connected with the tension band on opposite ends of the bight forming said nut retainer structure with said bight, said perforated walls being the outer part of the bight, and said protuberances being formed on said bridging member.

3. A hose clamp formed of at least three parts each separately manufactured and then assembled together, said parts comprising a circular metal tension band, a nut and a tightening screw, said metal tension band having end portions and there being means on the end portions having the tightening screw journalled therein for rotation for constricting the band on a hose connection or the like, said means including a nut retainer structure having a pair of upstanding parallel walls provided with inwardly directed resiliently yieldable protuberances, said protuberances being aligned on a line parallel to the axis of the circular tension band, said nut being of conventional construction and having a pair of opposite lateral parallel surfaces of predetermined spacing, the distance between protuberances being less than said spacing prior to assembly of the nut in the retainer structure whereby in order to assemble the nut to the band it is necessary to force the nut between the protuberances thereby spreading the protuberances apart and biasing the protuberances resiliently into frictional engagement with said lateral surfaces, the retainer structure having a perforated wall and the perforation being aligned with the axis of the threading opening of the nut, said tightening screw extending freely through the perforation and into engagement with the nut, whereby taking up on the screw will force the nut to overcome the frictional engagement of said protuberances and move toward and into engagement with the said perforated wall to cause constriction of said band, said walls being spaced apart by a dimension greater than the spacing between said parallel surfaces, said walls being of resilient metal and the protuberances being formed on said walls and being resiliently yieldable by reason of the resilience of said walls, said clamp being of the radial screw type and said end portions being overlapped and having a radially outward bight formed therein and a bridging member slidably connected with the tension band on opposite ends of the bight forming said nut retainer structure with said bight, said perforated wall being the outer part of the bight, and said parallel side walls being formed on said bridging member.

References Cited in the file of this patent

UNITED STATES PATENTS

| | | |
|---|---|---|
| 1,155,646 | D'Arcy | Oct. 5, 1915 |
| 1,584,332 | Tetzlaff | May 11, 1926 |
| 2,002,141 | Dumke | May 21, 1935 |
| 2,433,607 | Hallock | Dec. 30, 1947 |
| 2,633,886 | Tinnerman | Apr. 7, 1953 |

FOREIGN PATENTS

| | | |
|---|---|---|
| 904,964 | Germany | Feb. 25, 1954 |

UNITED STATES PATENT OFFICE

CERTIFICATE OF CORRECTION

Patent No. 3,086,270 April 23, 1963

Herbert P. Zartler

It is hereby certified that error appears in the above numbered patent requiring correction and that the said Letters Patent should read as corrected below.

Column 1, line 52, for "types of hose clamps" read -- type of hose clamp --; column 2, line 65, before "clamp" insert -- a --; line 66, strike out "either"; same line 66, after "screw" insert -- type --.

Signed and sealed this 12th day of November 1963.

(SEAL)
Attest:
ERNEST W. SWIDER

Attesting Officer

EDWIN L. REYNOLDS

Acting Commissioner of Patents